(12) United States Patent
Kang

(10) Patent No.: US 12,055,244 B2
(45) Date of Patent: Aug. 6, 2024

(54) PIPE SEALING DEVICE

(71) Applicant: Sugjae Kang, Yongin (KR)

(72) Inventor: Sugjae Kang, Yongin (KR)

( * ) Notice: Subject to any disclaimer, the term of this patent is extended or adjusted under 35 U.S.C. 154(b) by 235 days.

(21) Appl. No.: 17/623,567

(22) PCT Filed: Jul. 3, 2020

(86) PCT No.: PCT/KR2020/008740
§ 371 (c)(1),
(2) Date: Dec. 28, 2021

(87) PCT Pub. No.: WO2021/002727
PCT Pub. Date: Jan. 7, 2021

(65) Prior Publication Data
US 2022/0252191 A1    Aug. 11, 2022

(30) Foreign Application Priority Data

Jul. 3, 2019    (KR) ........................ 10-2019-0079739
Jul. 17, 2019   (KR) ........................ 10-2019-0086071
Jul. 21, 2019   (KR) ........................ 10-2019-0088002
Sep. 7, 2019    (KR) ........................ 10-2019-0111114
Feb. 6, 2020    (KR) ........................ 10-2020-0014094

(51) Int. Cl.
*F16L 19/065* (2006.01)
*F16L 19/02* (2006.01)

(52) U.S. Cl.
CPC ............ *F16L 19/065* (2013.01); *F16L 19/02* (2013.01)

(58) Field of Classification Search
CPC ......... F16L 19/04; F16L 19/06; F16L 19/061; F16L 19/065; F16L 19/0653; F16L 19/0656; F16L 19/075; F16L 21/007; F16L 35/00; F16L 55/171; F16L 33/222; F16L 2201/80; F16L 27/093
USPC .................................................. 285/191, 206
See application file for complete search history.

(56) References Cited

U.S. PATENT DOCUMENTS

| | | | |
|---|---|---|---|
| 4,282,982 A * | 8/1981 | Nuesslein | F16L 55/136 |
| | | | 220/236 |
| 2009/0167015 A1 * | 7/2009 | Nakata | F16L 19/10 |
| | | | 285/47 |
| 2015/0252933 A1 | 9/2015 | Stefani et al. | |

FOREIGN PATENT DOCUMENTS

| | | |
|---|---|---|
| JP | 2002-22087 A | 1/2002 |
| JP | 2003-56786 A | 2/2003 |
| JP | 2017-101829 A | 6/2017 |
| KR | 10-2001-0040307 A | 5/2001 |
| KR | 10-0593285 B1 | 6/2006 |
| KR | 20-0441371 Y1 | 8/2008 |
| KR | 10-2013-0111089 A | 10/2013 |
| KR | 10-1552120 B1 | 9/2015 |
| KR | 10-2017-0057516 A | 5/2017 |

* cited by examiner

*Primary Examiner* — Aaron M Dunwoody
(74) *Attorney, Agent, or Firm* — Heedong Chae; Lucem, PC

(57) ABSTRACT

The present invention includes: a first part which has a hollow cylindrical shape and circumscribes or is inscribed in a pipe; and a second part which has a cylindrical shape and circumscribes or is inscribed in the first part, wherein inclined portions, which have inclination angles that can hinder the second part from retreating from the first part, are formed between the first part and the second part so as to correspond to each other.

6 Claims, 11 Drawing Sheets

PIPE SEALING DEVICE

TECHNICAL FIELD

The present invention relates to an apparatus necessary for constructing a pipeline. More particularly, the present invention relates to a device that can be used when plugging the end of a pipe or when connecting a pipe, so that an airtight test of the pipe ("a pipe sealing test") and construction of the pipeline can be facilitated using the above device.

BACKGROUND ART

In general, a device for plugging or connecting a pipe is mainly used as a means of maintaining air-tightness (or sealing) and may have diverse forms. Such plugging or connecting work is generally implemented by screwing or welding, requires many work tools, and entails problems of consuming a lot of cost and time.

DISCLOSURE

Technical Problem

The present invention has been proposed to solve the aforementioned problems, and an object of the present invention is to easily plug or connect pipes without separate work tools, and to provide a fluid inlet whereby air-tightness tests can be easily conducted at any point even when a pipeline is not completed.

Technical Solution

The present invention relates to an apparatus necessary for constructing a pipeline, in particular, a pipe sealing device installed on the end of a pipe, including: a first part 11 that is in a hollow cylindrical shape, has an insertion hole 18 therein, through which a pipe 26 is inserted, and has an inclined portion 23 on the outer side, which has an outer diameter gradually increasing toward the end of the pipe ("pipe end") 29; and a second part 15 that is in a hollow cylindrical shape, has another inclined portion 23 therein, which has an inner diameter gradually increasing toward the pipe end 29 so as to correspond to the inclined portion 23 of the first part, and has a closed surface 32 formed on a cross-section at the pipe end side 29.

Further, an elastic member 41 may be provided below the pipe end 29 so that the inclined portions 23 of the first part 11 and the second part 15 are in contact.

Further, the closed surface 32 may be composed of a flexible material in order to confirm whether the constructed pipe has a pressure or not.

Further, the second part 15 may be provided with a safety member.

Further, the first part 11 may be in a hollow cylindrical shape and be parallel at the outer side thereof so as to be inserted into the pipe 26, and may have an inclined portion 23 therein, which has an inner diameter gradually decreasing toward the pipe end side. On the other hand, the second part 15 may be in a cylindrical shape and may have another inclined portion 23 on the outer side thereof, which has an outer diameter gradually decreasing toward the pipe end side so as to correspond to the inclined portion 23 of the first part.

Further, the second part 15 may be provided with a fluid inlet 43 at one side thereof.

Further, a stop part 37 may be provided at the end of the first part 11 at the pipe end side in order to prevent over-entry of the first part 11.

Further, the second part 15 may have a through-hole 55 in the center and a fluid inlet 43 extending from an inlet of the through-hole 55 at the pipe end side.

Further, the first part 11 may be in a hollow cylindrical shape and have an insertion hole 18 therein, through which the pipe 26 is inserted, and may have an inclined portion 23 on the outer side, which has an outer diameter gradually increasing toward the pipe end side 29. On the other hand, the second part 15 may be in a hollow cylindrical shape and may have another inclined portion 23 therein, which has an inner diameter gradually increasing toward the pipe end side 29 so as to correspond to the outer side of the first part 11. In this case, there is provided a symmetric part 57 configured to dispose opposite of second parts 15 to be symmetrical on opposite sides of the symmetric part in a longitudinal direction, wherein opposite of first parts 11 are disposed on opposite sides of the symmetric part to be symmetrical to opposite of the second parts 15, respectively.

Further, a tightening member 47 may be provided on one side of an intermediation part 45.

Further, the second part 15 may be provided with an external tightening member 51 on the outer side at a pipe center side.

Further, an elastic deformation member 19 may be provided at one end of the first part.

Further, the first part 11 may be in a hollow cylindrical shape and have an insertion hole 18 therein, through which the pipe 26 is inserted, and may have an inclined portion 23 on the outer side, which has an outer diameter gradually increasing toward the pipe end side 29. On the other hand, the second part 15 may be in a hollow cylindrical shape and may have another inclined portion 23 therein, which has an inner diameter gradually increasing toward the pipe end side 29 so as to correspond to the outer side of the first part 11. In this case, there is provided a serial part 69 configured to include another second part 15 in a longitudinal direction, wherein the serial part 69 may dispose opposite of first parts 11 in parallel to opposite of the second parts 15, respectively.

Further, a tightening device may be provided to closely contact the first part 11 and the second part 15.

Further, the first part 11 may have an extension portion 24 at the pipe center side.

Further, the first part 11 and the second part 15 may be in close contact with each other by the tightening member 47.

Further, an intermediate part 45 may be provided between the first part 11 and the second part 15.

Further, the tightening device may have a traction tightening member 61 at one end of the serial part 69.

Further, in order to connect pipes having different outer diameters, the pipe sealing device may be configured to have different diameters at opposite sides thereof.

Advantageous Effects

With regard to the pipe sealing device according to a preferred embodiment of the present invention, although pipe plugging or connection typically needs thread processing (or screwing) or welding work, the pipe sealing device of the present invention can easily plug or connect the pipes without such screwing or welding works.

Further, with regard to the pipe sealing device according to a preferred embodiment of the present invention, although conventional air-tightness tests are conducted after finishing the pipeline, using the present invention may attain effects of enabling the air-tightness test to be easily performed at desired times for each required section.

Further, with regard to the pipe sealing device according to a preferred embodiment of the present invention, although a typical drainage pipeline constructed with PVC pipes in addition to metal pipes is difficult to undergo a leakage test due to many pores, such leakage test may be easily implemented using the pipe sealing device of the present invention.

BEST MODE

Figure 1:
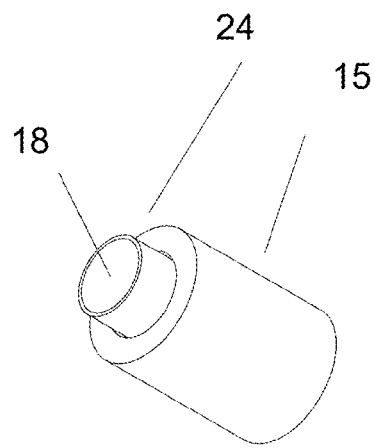
FIG. 1 is a perspective view of a pipe sealing device according to an embodiment of the present invention.

Hereinafter, preferred embodiments of the present invention will be described with reference to the drawings.

However, the embodiments of the present invention may be modified in various and different forms, and the scope of the present invention is not limited to the embodiments describe below. Further, the embodiments of the present invention are provided to more completely explain the present invention to those having average knowledge in the art. Accordingly, the shapes and sizes of elements in the drawings may be exaggerated for clearer explanation, and the elements indicated by the same reference numerals in the drawings are defined as the same elements.

The present invention relates to a device necessary for constructing a pipeline and, more particularly, a device that makes it possible to plug (or close) or connect pipes easily.

Figure 2:
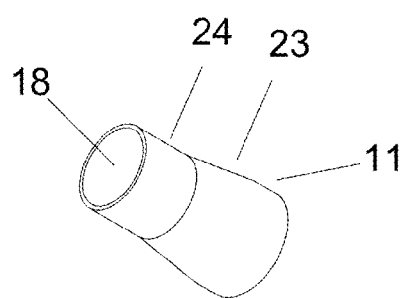
FIG. 2 is each exploded perspective view of first part and second part of the pipe sealing device.
Figure 2:
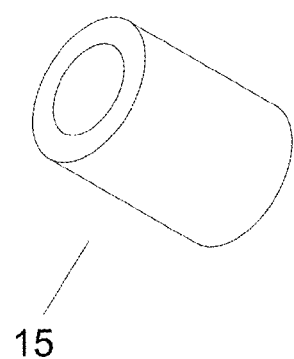
Figure 3:
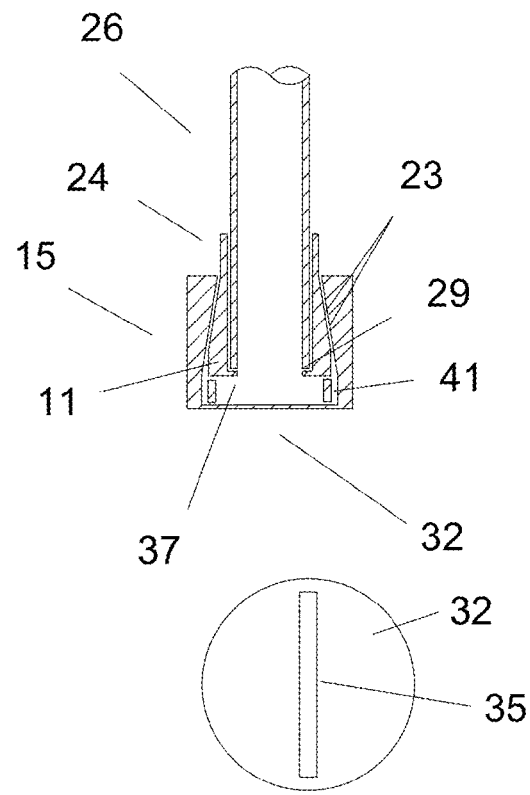
FIG. 3 is a cross-sectional view of the pipe sealing device and a front view of the closed surface.

According to a first embodiment, as shown in FIGS. 1 to 3, the pipe sealing device may include: a first part 11 that is in a hollow cylindrical shape, has an insertion hole 18 therein, through which a pipe 26 is inserted, and has an inclined portion 23 at the outer side, which has an outer diameter gradually increasing toward a pipe end side 29; and a second part 15 that is in a hollow cylindrical shape, has another inclined portion 23, which has an inner diameter gradually increasing toward the pipe end side 29 so as to correspond to the inclined portion 23 of the first part 11, and has a closed surface 32 formed on a cross-section at the pipe end side 29.

The inclined portion 23 may be configured to have a small angle so that a frictional force between the first part 11 and the pipe 26 becomes greater than a kinetic force generated due to a pressure applied to the closed surface 32 of the second part 15. The closed surface 32 of the second part 15 may be configured to have an anti-elastic force so as to confirm whether a pressure is applied to the pipe, or a safety member may be provided to relieve the pressure when excessive pressure is applied. Further, the first part 11 may be provided with a cylindrical extension part 24 parallel to a center direction of the pipe so as to facilitate convenience in removing the device. In FIG. 3, it is shown that the safety member 35 may be configured in a half cut form on the closed surface 32. A tightening member 47 may be provided to closely contact the first part 11 and the second part 15. In order to prevent pressure leakage when a fluid pressure is applied to the pipe, an elastic member 41 may be provided below the pipe end 29 between the first part 11 and the second part 15 such that the inclined portions of the first part 11 and the second part 15 are always in contact with each other. Further, a stop part 37 for preventing over-entry of the first part 11 may be formed at the pipe end side 29 of the first part 11. In this case, the pipe end side indicated herein refers to a direction in which the pipe end is placed when the pipe sealing device is installed, while the pipe center side refers to a direction toward the center of the pipe when the pipe sealing device is installed. Since the first part 11 and the second part 15 may be integrated and move together under force if the inclined portions 23 are fully and evenly touched to each other, the inclined portions may be configured to have different shapes in order to prevent the above situation. The inclined portion 23 may be present only in the first part 11 while the second part 15 may have a protrusion. Otherwise, the inclined portion 23 may be formed only in the second part 15 while the first part 11 may have a protrusion. Alternatively, the inclined portion may be configured only in a short section, may have a linear form or a non-linear form, otherwise, may have various shapes as needed, which correspond to all of the inclined portions in the present invention.

According to the present invention, it should be understood that components may refer to as the same name when those play the same role even if the components have different shapes.

With regard to the above embodiments, more particularly, in order to plug (or close) one end of the pipe 26, the first part 11 and the second part 15 may be combined and then inserted into the above end through the insertion hole 18. When applying a pressure from the other end of the pipe, the pressure pushes the closed surface 32 of the second part 15 and then the second part 15 may be pushed out and press the inclined portion 23 of the first part 11. As a result, the first part 11 may receive a force in a lateral direction larger than a force in a longitudinal direction so that the first part 11 is stopped in its place while the second part 15 may move slightly along the inclined portion 23 and then stopped at an escape limit point due to an inclination angle.

DETAILED DESCRIPTION OF PREFERRED EMBODIMENTS OF INVENTION

Figure 4:
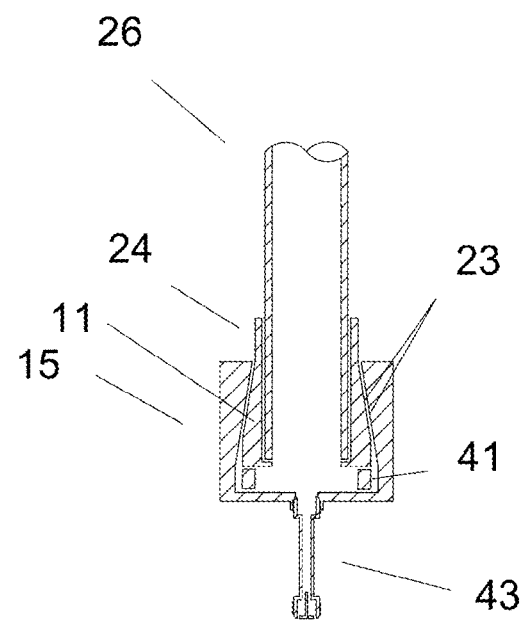
FIG. 4 is a cross-sectional view of the pipe sealing device provided with a fluid inlet.

According to a second embodiment, as shown in FIG. 4, a fluid inlet 43 may be provided on one side of the second part 15 at the pipe end side, which in turn may be connected to a pressure device or a pressure gauge for air-tightness test of the pipe.

In detail, a hole is made in the closed surface 32 of the second part 15 to configure a vertically extending fluid inlet 43, so as to allow a pressure to be applied to a pipeline cycle or detect the pressure.

Figure 5:
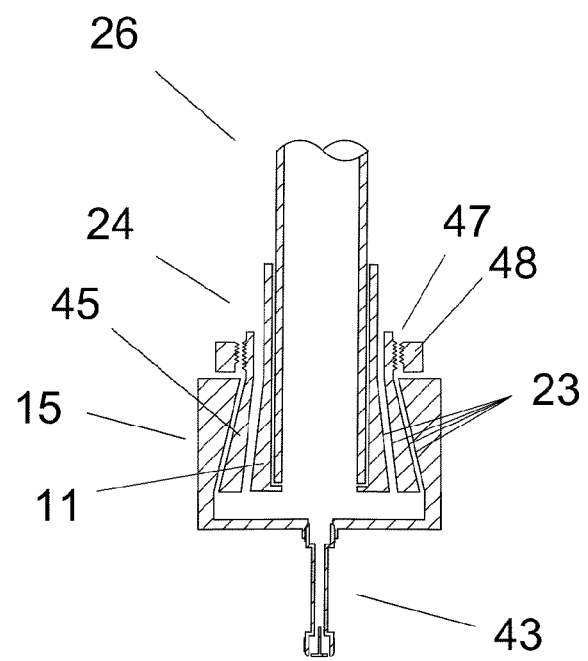
FIG. 5 is a cross-sectional view of the pipe sealing device including an intermediate part formed therein.

According to a third embodiment, an intermediate part 45 may be formed between the first part 11 and the second part 15 as shown in FIG. 5. In order to have a greater frictional force against the pipe 26 by the inclined portion than an escape force of the second part 15 due to pressure, the inclination angle should be small. In this case, the second part 15 and the first part 11 are severely pinched and thus it is difficult to return these parts to their original states. In order to solve this problem, a hollow and cylindrical intermediate part 45 may be provided between the first part 11 and the second part 15, wherein an inclined portion 23 of the intermediate part 45 is configured to have an outer inclination angle larger than an inner inclination angle. In particular, an inner inclined portion 23 of the intermediate part 45 may be configured to correspond to an outer inclined portion 23 of the first part 11, while an outer inclined portion 23 of the intermediate part 45 is configured to correspond to an inner inclined portion 23 of the second part 15. Further, the intermediate part 34 may be made of an elastic material.

A cylindrical extension part parallel to the pipe center side of the intermediate part 45 may be provided, and the extension part may be provided with a tightening member 47. Such a tightening member 47 may have a rotatable fastener 48 that advances and retreats by thread coupling ("screwing").

In more detail, the pipe sealing device of the present invention may be mounted on the end of a pipe, followed by tightening the fastener 48 of the tightening member 47 to enable the intermediate part 45 to be in close contact with the second part 15 as much as possible, thereby entering in the direction of the pipe center side. In order to mount the device of the present invention on the pipe 26, fluidity such as elasticity as well as a clearance were required between the first part 11, the intermediate part 45 and the second part 15. This means that the second part 15 would retreat as much as the fluidity when a pressure is applied thereto. Since the smaller a width of the retreat, the better, it is possible to reduce the fluidity by adopting the tightening member 47. One side of the intermediate part 45 on which the tightening member 47 is configured may be made of a material without elasticity, that is, a non-elastic material. The intermediate part 45 may be configured in multiple layers. When the pressure in the pipe is released and the device is recovered, the inclination angle between the second part 15 and the intermediate part 45 is large so that the second part 15 may be easily separated from the intermediate part 45. Further, the intermediate part 45 expands due to elasticity and thus may be easily separated from the first part 11.

Figure 6:
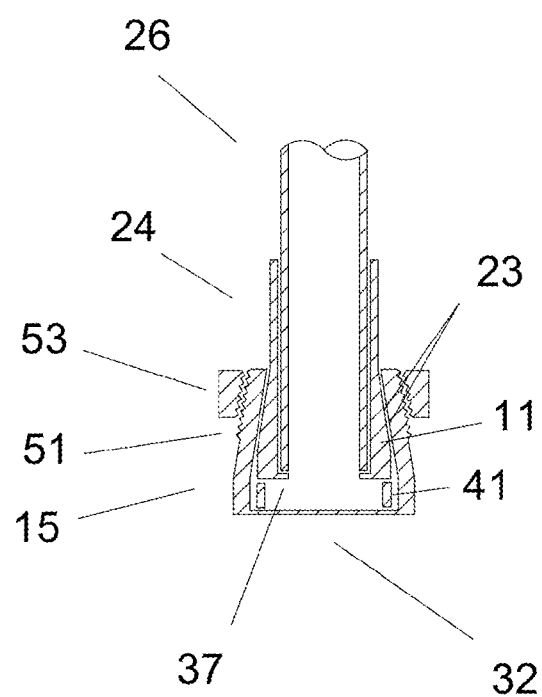
FIG. 6 is a cross-sectional view of the pipe sealing device provided with an external tightening member.

According to a fourth embodiment, an external tightening member 51 may be configured outside the pipe center side of the second part 15 as shown in FIG. 6. The external tightening member 51 may have a rotatable external fastener 53 that advances and retreats by screwing. The external fastener 53 of the external tightening member 51 may be configured to have an inclined portion coupled to the second part 15 and, depending on a coupling depth, may press the second part 15. One side of the second part 15 at the external tightening member side may be made of an elastic material.

In more detail, the pipe sealing device of the present invention may be mounted on a pipe 26, followed by tightening the external fastener 53 to contract the second part 15, thereby enabling the second part 15 to be in close contact with the first part 11. Therefore, when a pressure is applied, a retraction width of the second part 15 may be reduced. On the other hand, when the pipe sealing device is returned to its original stage after finishing air-tightness test, etc., the second part 15 may be returned to its original state by loosening the external tightening member 51, so that the second part 15 can be easily separated from the first part 11.

Figure 7:
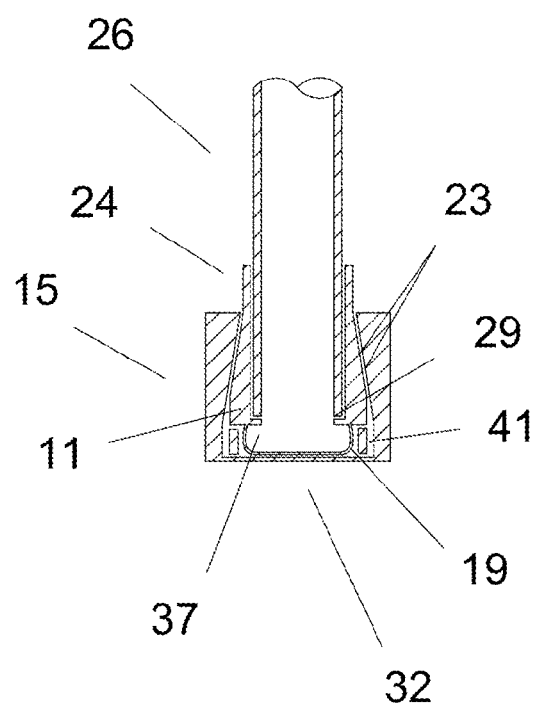
FIG. 7 is a cross-sectional view of the pipe sealing device provided with an elastic deformation member.

According to a fifth embodiment, an elastic deformation part 19 may be provided on one end of the first part at the pipe end side as shown in FIG. 7, thereby completing air-tightness in the first part. The elastic deformation part 19 may be made of a material having high elasticity and may be in surface-contact with the second part to limit expansion. In this way, an interface between the first part and the second part may be free from air-tightness and thus may be made of a non-elastic material. The first part and the elastic deformation part 19 may be integrated or separately configured.

In more detail, when a pressure is applied from the other end of the pipe, the elastic deformation part extending from a penetrating end of the first part and plugging (or closing) one side of the first part is subjected to the pressure, retreats, and is in surface-contact with the second part and thus blocked, thereby stopping expansion. Therefore, the interface between the first part and the second part becomes free from air-tightness and thus may be made of a material with low elasticity, thereby enabling easy of removal of the pipe sealing device.

Figure 8:
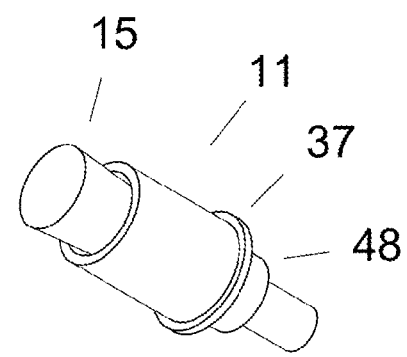
FIG. 8 is a perspective view and a cross-sectional view of a pipe sealing device according to a sixth embodiment.
Figure 8:
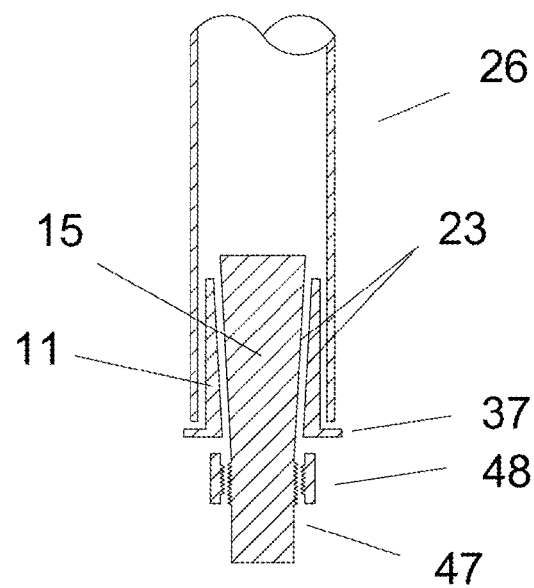

According to a sixth embodiment, the pipe sealing device of the present invention may be installed inside a pipe 26 as shown in FIG. 8. In this case, the device may include: a first part 11 that is in a hollow cylindrical shape having a parallel outer side and has an inner inclined portion 23, which has a diameter (that is, inner diameter) gradually decreasing toward the pipe end side; and a second part 15 that is in a cylindrical shape and located inside the first part 11 and has another inclined portion 23, which has an outer diameter gradually decreasing toward the pipe end side so that an outer side of this inclined portion may correspond to the inner inclined portion 23 of the first part 11.

Further, a stop part 37 may be provided on one end of the first part at the pipe end side in order to prevent the device from over-entering the pipe 26. The second part 15 may be provided with a tightening member 47 to prevent the device mounted on the pipe 26 from dropping out and also prevent the second part 15 from slipping into the pipe 26.

Figure 9:
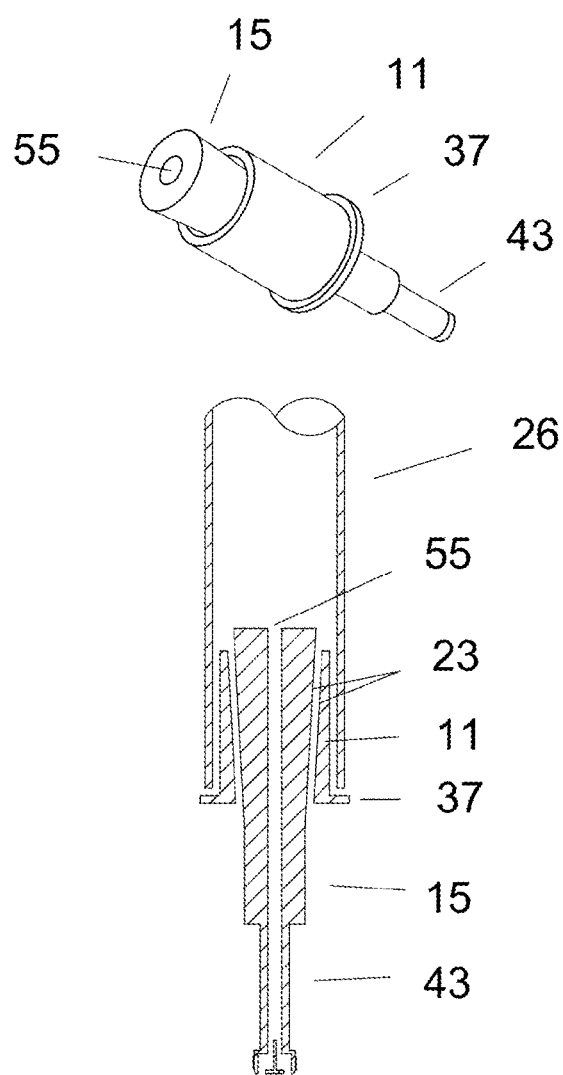
FIG. 9 is a perspective view and a cross-sectional view of a pipe sealing device provided with a fluid inlet according to a seventh embodiment.

According to a seventh embodiment, which is substantially the same as the sixth embodiment in terms of lots of configurations as shown in FIG. 9. However, a through-hole 55 may be formed in the center of the second part 15, a fluid inlet 43 may be formed at an inlet of the through-hole 55 at the pipe end side. The through-hole 55 may enable fluid flowing, and the fluid inlet 43 may function to increase/decrease a pressure and/or detect the pressure.

Figure 10:
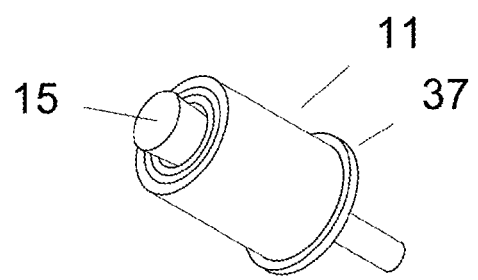
FIG. 10 is a perspective view and a cross-sectional view of a pipe sealing device including an intermediate part formed therein according to an eighth embodiment.
Figure 10:
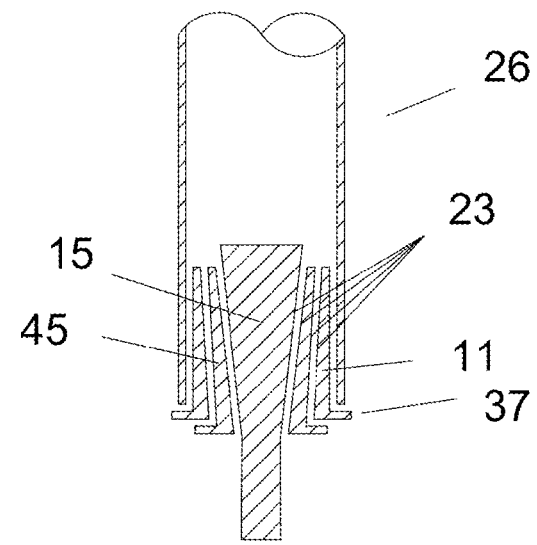

According to an eighth embodiment, with regard to the pipe sealing device inserted into the pipe 26 as shown in FIG. 10, an intermediate part 45 may be configured between the first part 11 and the second part 15. In order to have a greater frictional force against the pipe by the inclined portion 23 than an escape force of the second part 15 due to pressure, the inclination angle should be small. In this case, the second part 15 and the first part 11 are severely pinched, and thus it is difficult to return these parts to their original states. In order to solve this problem, a hollow and cylindrical intermediate part 45 may be provided between the first part 11 and the second part 15, wherein an inclined portion 23 of the intermediate part 45 is configured to have an inner inclination angle larger than an outer inclination angle. In particular, an outer inclined portion 23 of the intermediate part 45 may be configured to correspond to an inner inclined portion 23 of the first part 11, while an inner inclined portion 23 of the intermediate part 45 is configured to correspond to an outer inclined portion 23 of the second part 15. Further, the intermediate part 45 may be made of an elastic material. When the pressure in the pipe is released and the pipe sealing device of the present invention is recovered, the inclination angle between the second part 15 and the intermediate part 45 is large so that the second part 15 may be easily separated from the intermediate part 45. Further, the intermediate part 45 is elastic and thus may be easily separated from the first part 11.

Further, the intermediate part 45 may be provided with a tightening member 47. The pipe sealing device of the present invention may be mounted on the end of a pipe, followed by tightening the tightening member 47 to allow the intermediate part 45 to be in close contact with the second part 15 as much as possible. The intermediate part 45 may be configured in multiple layers.

Figure 11:
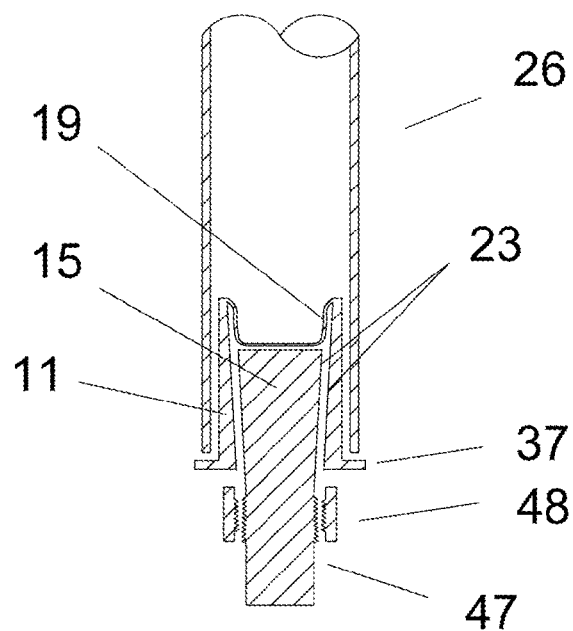
FIG. 11 is a cross-sectional view of a pipe sealing device provided with an elastic deformation member according to a ninth embodiment.

According to a ninth embodiment, a high elastic deformation part 19 may be provided on one end of the first part at the pipe center side as shown in FIG. 11. Therefore, air-tightness may be completed in the first part and the elastic deformation part may be in contact with the second part and the first part, while expansion thereof is restricted. In this way, an interface between the first part and the second part is free from air-tightness and thus may be made of a non-elastic material.

Figure 12:
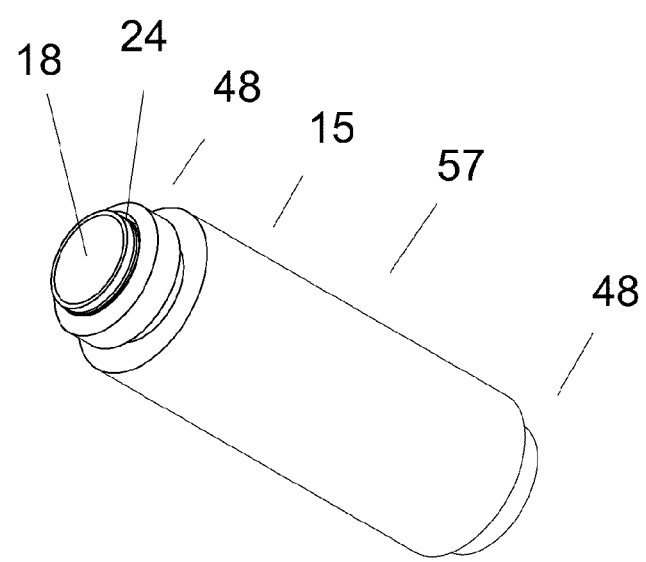
FIG. 12 is a perspective view of a pipe sealing device according to a tenth embodiment.
Figure 13:
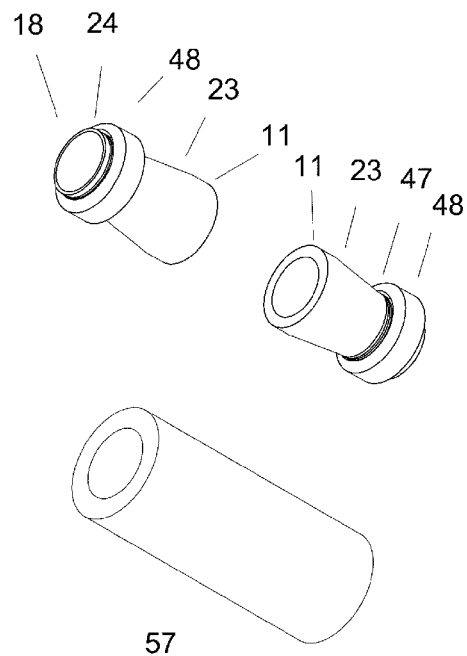
FIG. 13 is an exploded perspective view of the pipe sealing device according to the tenth embodiment.
Figure 14:
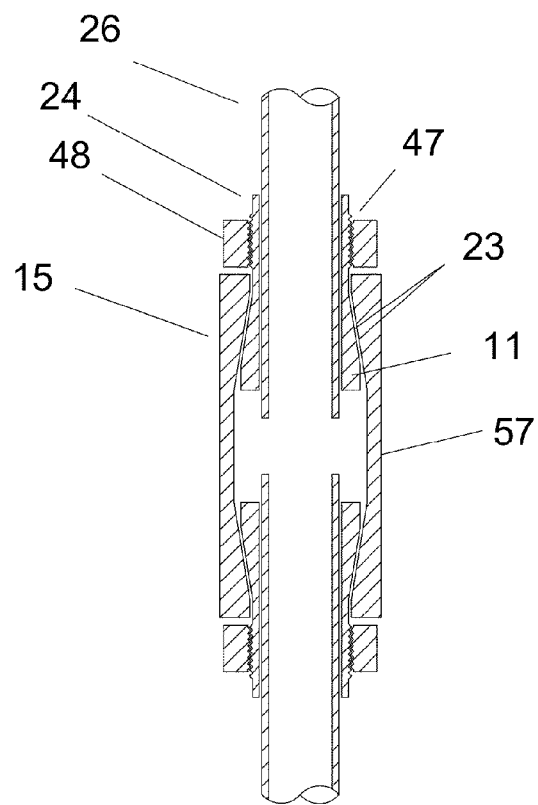
FIG. 14 is a cross-sectional view of the pipe sealing device according to the tenth embodiment.

According to a tenth embodiment, as shown in FIGS. 12 to 14, the pipe sealing device of the present invention may include: a first part 11 that is in a hollow cylindrical shape, has a parallel insertion hole 18 therein, through which the pipe 26 is inserted, and has an inclined portion 23 on the outer side, which has an outer diameter gradually increasing toward the pipe end side; a second part 15 that is in a hollow cylindrical shape and has another inclined portion 23 therein, which has an inner diameter gradually increasing toward the pipe end side so as to correspond to the inclined portion 23 of the first part 11; and a symmetric part 57 configured to dispose opposite of second parts 15 to be symmetrical on opposite sides thereof in a longitudinal direction, wherein opposite of first parts 11 are disposed to be symmetrical on opposite sides of the symmetric part 57 in the longitudinal direction in order to interlock with opposite of the second parts 15, respectively.

A tightening member may be provided to make close contact between the first part 11 and the second part 15. Such a tightening member 47 may have a rotatable fastener 48 that advances and retracts by screwing. The first part 11 may be made of an elastic material. One side of the first part 11 on which the tightening member 47 is present may be made of a non-elastic material.

In more detail, in order to mount the pipe sealing device of the present on a pipe, the pipe may be inserted into the insertion hole 18 of the first part 11, followed by rotating the fastener 48 of the tightening member 47 to closely contact the first part 11 and the second part 15, whereby the second part 15 is pushed and the first part 11 is pressed by the inclined portion 23 and then is in close contact with the pipe while the second part 16 may stop at a retreat limit point. As such, when the work on opposite sides of the pipe sealing device is completed, the pipe may be kept tight (or sealed) and also fixed.

An intermediate part 45 may be provided between the first part 11 and the second part 15.

The pipe sealing device of the present invention may have different diameters on opposite sides thereof in order to connect pipes with different outer diameters.

Figure 15:
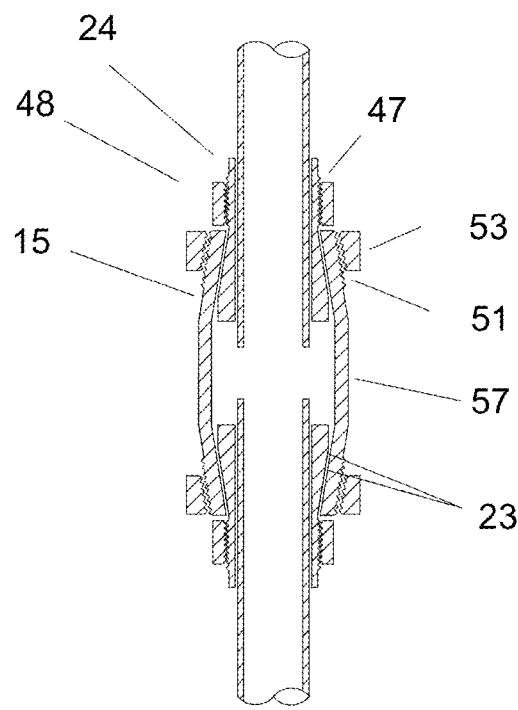
FIG. 15 is a cross-sectional view of a pipe sealing device according to an eleventh embodiment.

According to an eleventh embodiment which is substantially the same as the tenth embodiments in terms of many configurations as shown in FIG. 15. However, an external tightening member 51 may be provided outside the end of the second part 15. The external tightening member 51 may have a rotatable external fastener 53 that advances and retreats by screwing. The external fastener 53 of the external tightening member 51 may be configured to have an inclined portion coupled to the second part 15 and, depending on a coupling depth, may press the second part 15. One side of the second part 15 at the external tightening member side 51 may be made of an elastic material.

In more detail, if opposite sides of the pipe is fixed, the pipe is inserted into opposite sides of the pipe sealing device and opposite fasteners 48 are rotated together to pull out the first part 11 without advancing/retreating the second part 15, whereby the first part 11 and the second part 15 can be brought into close contact with each other as much as possible. Further, rotating the external fastener 53 may contract the second part 15 so as to complete pipe sealing.

Figure 16:
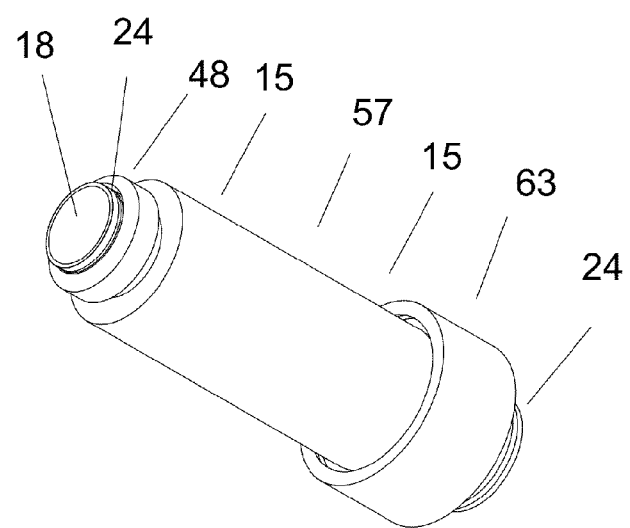
FIG. 16 is a perspective view of a pipe sealing device according to a twelfth embodiment.
Figure 17:
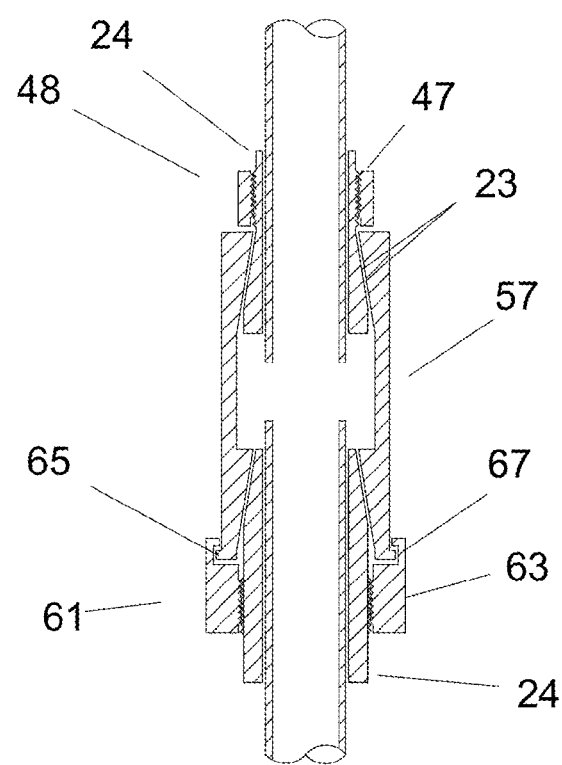
FIG. 17 is a cross-sectional view of the pipe sealing device according to the twelfth embodiment.

According to a twelfth embodiment which is substantially the same as the tenth embodiment in terms of some configurations as shown in FIGS. 16 and 17. However, the pipe sealing device may have a serial part 69 that is configured to dispose two second parts 15 side by side in the same direction, that is, in a longitudinal direction, wherein two first parts 11 are also disposed side by side in the same direction so as to correspond to opposite of the second parts 15 in the serial part 69, respectively. Further, the pipe sealing device may be provided with a tightening device on each of opposite ends thereof. The tightening device may be configured to have a tightening member 47 on one side and a traction tightening member 61 on the other side thereof. The tightening member 47 may have a rotatable fastener 48 that advances and retreats by screwing. Further, the traction tightening member 61 may have a traction fastener, wherein one side of the traction fastener is coupled through a protrusion 65 and a hook 67 while the other side thereof is coupled by screwing.

In more detail, the tightening member 47 and the traction tightening member 61 may push the second part 15 in the same direction, and is considered as a preferred means that can be used when pipes are fixed at opposite sides thereof. It is preferable that opposite tightening members 47 tighten a single body alternately or concurrently when pushing and pulling (or dragging) the body. The protrusion 65 and the hook 67 of the traction tightening member 61 may enable traction while freely rotating, and thread-coupling leads advancing/retraction through rotation. The tightening member 47 at one side may rotate the fastener 48 and push the second part 15, thereby enabling the first part 11 at one side to be in close contact with the pipe at one side. On the other hand, the traction tightening member 61 may rotate the traction fastener 63 and pull the second part 16, whereby the first part 11 at the other side can be in close contact with the pipe at the other side.

INDUSTRIAL APPLICABILITY

The pipe sealing device of the present invention makes it possible to plug and connect pipes simply and easily. Pipe sealing test in diverse sites where a pipeline is constructed may be a work that must be performed in most cases. Until now, pipes were sealed by welding or pipe sealing tests have been conducted after completing the pipeline. However, when the pipe sealing device of the present invention is used, the pipes do not need weld-plugging and a pipe sealing test may be conducted directly in each section as required. Further, although a drainage pipeline constructed of PVC pipes was difficult to undergo the pipe sealing test due to many pores, using the pipe sealing device of the present invention may easily plug the pores and thus make it easy to perform the pipe sealing test. When connecting pipes, the pipes may be fitted in a fitting manner, thereby simply and easily constructing a pipeline.

The invention claimed is:

1. A pipe sealing device installed on an end of a pipe, comprising:
    a first part (11) that is in a hollow cylindrical shape, has an insertion hole 18 therein, through which a pipe (26) is inserted, and has an inclined portion (23) on an outer side, which has an outer diameter gradually increasing toward a pipe end side; and
    a second part (15) that is in a hollow cylindrical shape, has another inclined portion (23) therein, which has an inner diameter gradually increasing toward the pipe end side so as to correspond to the inclined portion (23) of the first part, and has a closed surface (32) formed on a cross-section at the pipe end side, and
    wherein an intermediate part (45) is provided between the first part (11) and the second part (15).

2. The device according to claim 1, wherein the closed surface (32) is configured to have an anti-elastic force.

3. The device according to claim 1, wherein the second part (15) is configured to have a safety member on one side thereof.

4. The device according to claim 1, wherein an external tightening member (51) is provided on an outer side of the second part (15) at the pipe end side.

5. The device according to claim 1, wherein the second part 15 has a fluid inlet (43) on one side thereof.

6. The device according to claim 1, wherein the first part (11) is provided with an elastic deformation part (19).

* * * * *